April 3, 1956      J. C. GINDRAUX      2,740,287
GOLF BALL TESTER
Filed Sept. 7, 1954
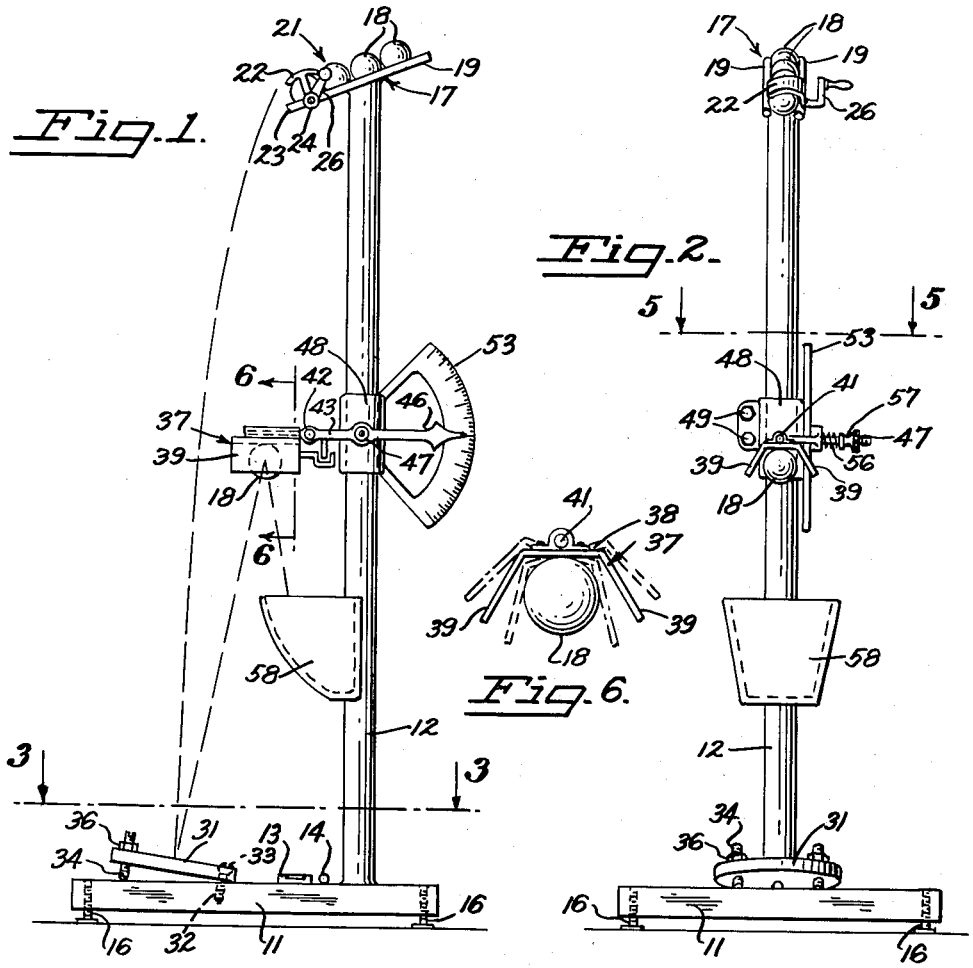
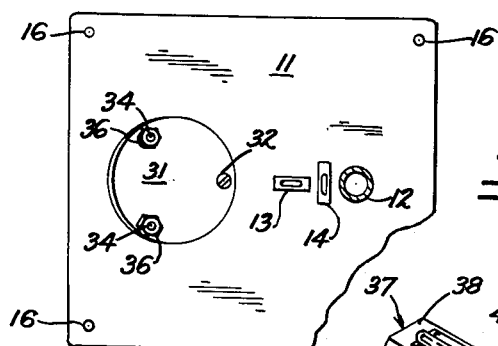
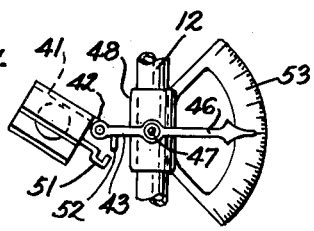
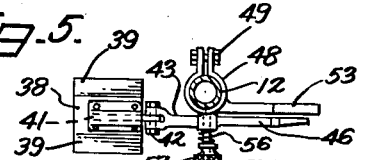
INVENTOR.
JULES C. GINDRAUX
BY
Townsend, Townsend and Hoppe
ATTORNEYS United States Patent Office 2,740,287
Patented Apr. 3, 1956

2,740,287

GOLF BALL TESTER

Jules C. Gindraux, Los Altos, Calif.

Application September 7, 1954, Serial No. 454,361

4 Claims. (Cl. 73—12)

This invention relates to a new and improved device for testing the resiliency and balance of golf balls and the like.

The present invention has for one of its principal objects and purposes the provision of a simple, portable, manually-operated ball-testing machine which may be used to test and compare the resiliency of various balls such as golf balls. Thus, the present invention is designed to enable golfers to compare different makes of balls or to determine whether a used ball has exceeded its period of maximum travel.

Another feature of the invention is the provision of a machine which not only tests the resiliency of the ball but also the balance and functional trueness of the ball by discarding those balls which do not bounce on a true line. Another feature of the invention is the provision of an indicator which comes to a stop to indicate the resiliency of a given ball as contrasted with a free-swinging needle, the use of which requires close attention and proficiency to determine the maximum of its movement.

Another feature of the invention is the provision of an adjustment anvil on which the ball strikes, the anvil being adjustable to compensate for variations and inaccuracies in assembly of the device and other variable factors.

Other objects of the present invention will become apparent upon reading the following specification and referring to the accompanying drawings in which similar characters of reference represent corresponding parts in each of the several views.

In the drawings:

Fig. 1 is a side elevation of the device.

Fig. 2 is a front elevation thereof.

Fig. 3 is a horizontal section taken substantially along the line 3—3 of Fig. 1, and Fig. 4 is a horizontal, fragmentary side elevation of the indicator mechanism.

Fig. 5 is a sectional view taken substantially along the line 5—5 of Fig. 2.

Fig. 6 is a schematic vertical sectional view taken substantially along the line 6—6 of Fig. 1 and showing the angular movement of the deflector for balls of normal and abnormal balance.

Fig. 7 is a perspective view of the indicating mechanism.

The device which is the subject of this invention comprises a frame consisting of a horizontal base 11 and a vertical stand 12. In order that the use of the device may be accurate, it is desirable that the accuracy of the horizontal positioning of the base be maintained. In order to test this accuracy, a pair of horizontal bubble levels 13 and 14 of conventional design are disposed on the base at right angles to each other. Adjustment screws 16 on the underside of the base are provided to adjust the base to horizontal position.

At the top of the stand 12 is a rack 17 for a plurality of balls 18. Such a rack may be formed of parallel, downwardly-inclined rods 19 spaced apart a distance less than the diameter of the balls being tested. An escapement 21 is located adjacent the lower end of the rack comprising an arcuate gate 22 attached to two depending arms 23 which are pivoted to the rack by means of pivot pins 24. One of the pins also carries a handle 26. By turning the handle 26 rearwardly, the lowermost ball 18 is released and at the same time the rear edge of the gate 22 prevents the next ball on the rack from following the released ball. When the handle 26 is released, the weight of the balls on the rack returns the gate 22 to a position which prevents additional balls from being released until the handle 26 is again turned.

The released balls 18 strike against an anvil 31 mounted on and at an acute angle with respect to the base 11. To compensate for inaccuracies in the alignment of the stand 12 to the base 11, the anvil is made adjustable. Thus, three screws are provided, one screw 32, which is closest to the stand, passing through the anvil and being in threaded engagement with a tapped hole in the base. This screw has a spherical bottom 33 on its head and fits into a spherical socket in the anvil 31 in the manner of a ball and socket fit so as to enable the anvil to be tightened against the base but likewise enables the angular adjustment of the anvil relative to the base to be varied. Variation in such angular adjustment is accomplished by means of two forward adjustment screws 34 which pass through the anvil and bear against the base. By loosening and tightening these forward adjustment screws 34 the trueness of the anvil surface against which the ball strikes relative to the stand 12 may be adjusted and once adjusted lock nuts 36 may be employed to hold the adjustment screws 34 in position.

When the ball strikes against the anvil 31, it is deflected upwardly and rearwardly toward the stand 12, and strikes a channel-shaped deflector member 37 having a substantially horizontal base 38 and outwardly and downwardly diverging sides 39. Deflector member 37 is mounted for pivotal movement on horizontal outer arm 41. Outer arm 41 is connected by means of hinge 42, which has a horizontal axis, to inner arm 43, which is one end of a lever, the opposite end of which comprises a pointer 46. Pivot 47 comprises the fulcrum for the lever which consists of inner arm 43 and pointer 46. Pivot 47 is connected to split collar 48 which surrounds stand 12, the position of split collar 38, and hence, of pivot 47 being vertically adjustable by loosening screws 49 permitting the split collar to slide on stand 12 until the position of adjustment is determined, whereupon screws 49 are tightened.

Hook-shaped member 51 is attached to deflector 37 and inner arm 43 carries detent 52, which, when deflector 37 is in normal position, is engaged by hook 51 so that a ball 18 striking against the base 38 of channel-shaped deflector 37 causes outer arm 41 to move vertically upward, likewise causing inner arm 43 to move upward and pointer 46 to move downward. However, if the ball 18 is not true, it strikes against either one of the two outwardly diverging sides 39 of deflector 37, which by reason of the fact that deflector 37 is pivotally mounted relative to outer arm 41, causes hook 51 to disengage from detent 52 thereby permitting outer arm 41 to swing upwardly about hinge 42 and maintaining inner arm 43 and pointer 46 stationary.

As has been indicated, only balls which are true and which do not engage the outwardly diverging sides 39 of channel-shaped deflector 37 cause movement of pointer 46. Fig. 6 indicates schematically how deflector 37 may pivot about arm 41 depending upon the trueness of balance of the ball. The action of the hood when deflected by a true ball is shown in solid lines in Fig. 6. Deflection by an off-center ball toward the right is shown in dash lines. Deflection toward the left is shown in dot-and-dash lines.

Adjacent the path of movement of the pointer 46 is an arcuate scale 53 fastened to stand 12 which indicates the degree of resiliency of the ball which strikes the deflector 37. Spring 56 is interposed between the inner arm 43 and an adjustment nut 57 which is threaded on the pivot 47. The spring 56 functions to exert pressure against the inner arm 43 such that when the pointer 46 reaches the maximum position of deflection resulting from a ball striking the deflector 37, the pointer 46 is held in place rather than being permitted to swing freely. Adjustment nut 57 enables the responsiveness of the pointer 46 to reflect the impact of the ball to be tested, but it will be understood that once adjusted it is not necessary to alter the adjustment nut 49 unless there is some change in the conditions affecting the testing of the balls. If the ball is not true, no movement of pointer 46 is indicated.

Balls hitting the deflector 37 are deflected downwardly into a bin 58 mounted on stand 12 where they may be retrieved.

In operation, the device may be located in a store, caddy shop or other location where balls are sold or located near one or more of the tees of a golf course. The device is intended to enable golfers to compare the resiliency of competitive balls or to determine whether a ball has sufficient resiliency to make it useful in play. Balls 18 are deposited in the rack 17 at the top of the stand and are released one at a time by turning the handle 26 backwardly. Release of a ball 18 causes it to drop with a minimum of spin onto the anvil 31 and to be deflected upwardly and rearwardly. If the balance and functional trueness of the ball is satisfactory it will not hit sides 39 of deflector 37 and hence will cause deflection of the pointer 46 depending upon the impact with which the ball strikes the deflector, which impact in turn is a function of the resiliency of the ball. The pointer 46 is maintained in position so that the amount of deflection may be observed conveniently by the position of pointer 46 relative to scale 53. The ball rebounds from the deflector 37 into bin 58 where it may be retrieved. After the test is completed and its result observed, the pointer 46 is manually returned to zero.

Although the foregoing invention has been described in some detail by way of illustration and example for purpose of clarity of understanding, it is understood that certain changes and modifications may be practiced within the spirit of the invention and scope of the appended claims.

What is claimed is:

1. In a device for testing the resiliency of balls, a stand, an anvil mounted on said stand, releasing means located on said stand substantially above said anvil for dropping a ball on said anvil, a deflector pivotally mounted on said stand for movement in a horizontal plane and located to intercept balls dropped from said releasing means onto said anvil on the rebound, a pointer conected to said deflector and moved thereby, a scale on said stand located adjacent the path of movement of said pointer, and resilient means resisting return movement of said pointer whereby said pointer remains at its maximum deflection until manually reset.

2. A device according to claim 1 which further comprises means positioned to be engaged by inaccurate balls operable to disengage said pointer from said deflector, said means comprising a releasable connection between the deflector and pointer.

3. A device according to claim 1 which further comprises a scale adjacent and parallel to the path of movement of said pointer, a pivot pin on which said pointer is mounted and means carried by said pin and bearing against said pointer to stop said pointer at the point of maximum deflection thereof.

4. In a device for testing the resiliency of balls dropped upon an anvil and rebounded therefrom, the combination of a stand, a deflector carried by the stand and located to intercept balls on the rebound from said anvil, a pointer connected to said deflector and moved thereby, a scale connected to said stand and located adjacent the path of movement of said pointer, and means connected to said pointer to resist return movement thereof whereby the pointer remains at its maximum deflection.

References Cited in the file of this patent

UNITED STATES PATENTS

| 1,059,596 | Cook | Apr. 22, 1913 |
| 1,883,557 | Cheney | Oct. 18, 1932 |
| 2,517,545 | Cushman | Aug. 8, 1950 |
| 2,699,672 | Couch | Jan. 18, 1955 |

FOREIGN PATENTS

| 486,533 | Great Britain | June 7, 1938 |